May 24, 1955  F. M. ADASHEK  2,708,859
PLURAL SLIDE HOLDERS
Filed March 27, 1952  2 Sheets-Sheet 2
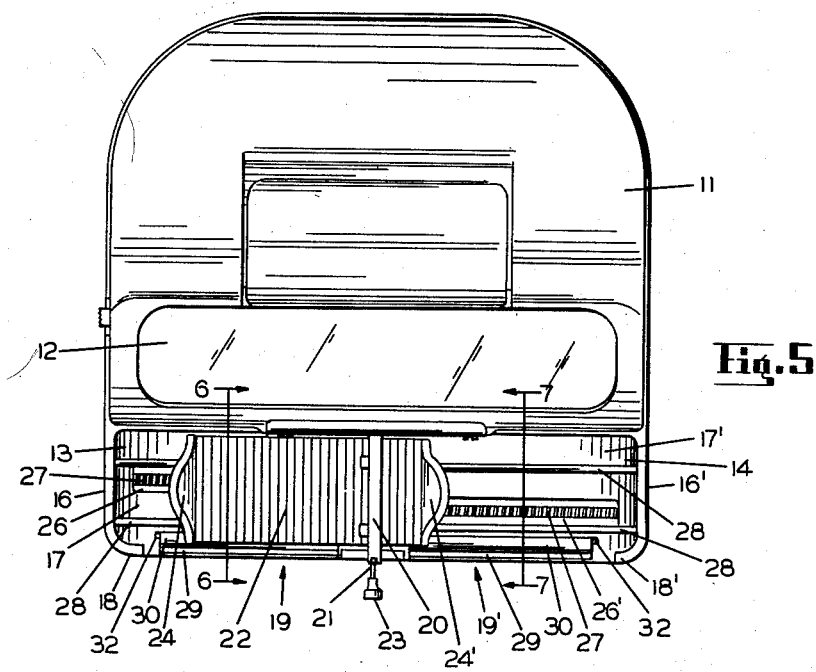
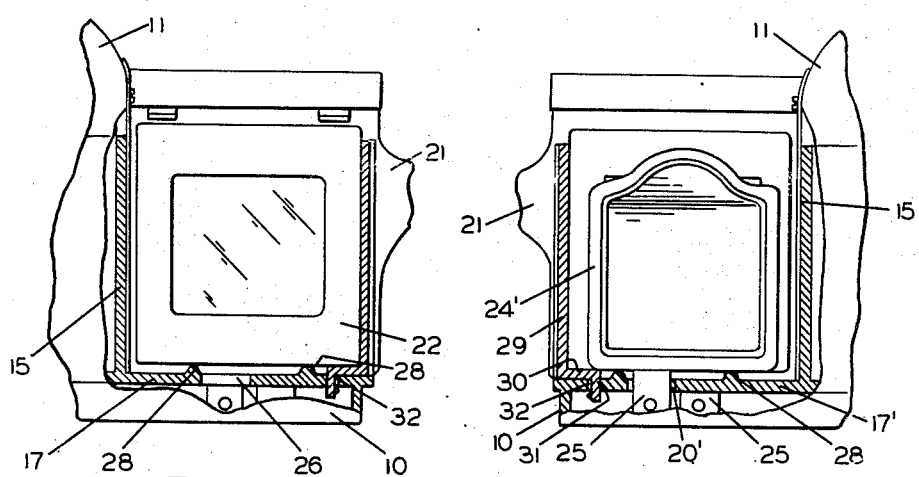
INVENTOR.
FLOYD M. ADASHEK
BY
Christian D. Nielsen
ATTORNEY.

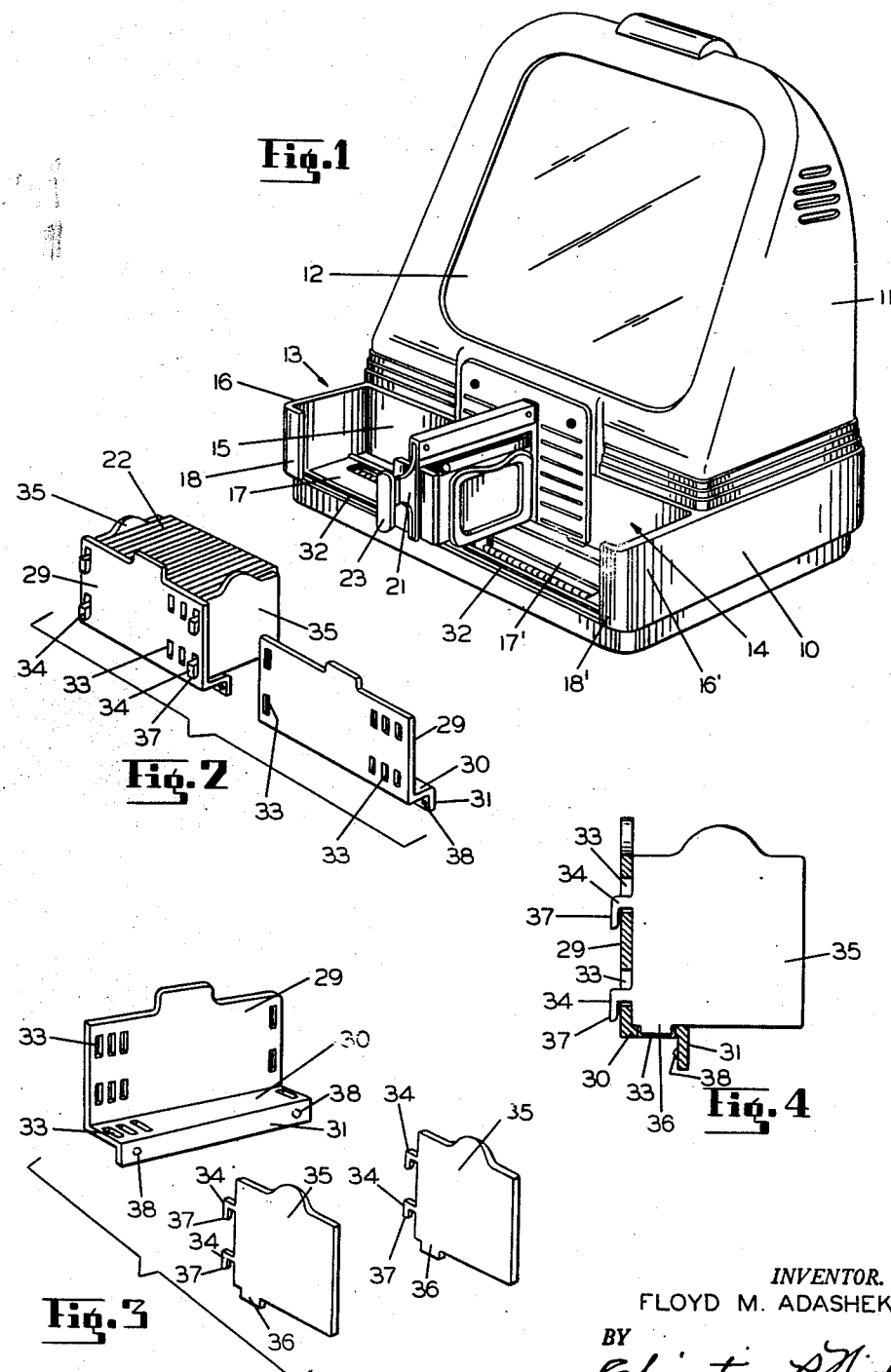

United States Patent Office 2,708,859
Patented May 24, 1955

2,708,859

PLURAL SLIDE HOLDERS

Floyd M. Adashek, Milwaukee, Wis.

Application March 27, 1952, Serial No. 278,919

3 Claims. (Cl. 88—28)

My invention relates to photostatic slide holders and more particularly to adapters to be used in connection with photographic viewers.

The object of my invention is to provide portable slide holders comprising a plurality of parts, to permit storing the slides when not in use, and adapted to fit into engagement with the photographic viewer, as a unit.

Another object of my invention is to provide an adapter for photographic slides that may be easily assembled and disassembled for the purpose of storing and conveying a quantity of slides, and permit inserting them into a photographic viewer as a unit, in a manner whereby the slides will be transposed from one adapter to the other.

It is manifest to anyone familiar with the art that assembled photograph slides, whether constructed of paper or glass, are usually placed one at a time into trays forming a part of the viewer. This necessitates handling the individual slides when loading and unloading the viewer, and exposes the slides to surface wear and also necessitates additional handling of the individual slide in their manipulation.

The device, illustrated, specified, and claimed herein, consists of separate sectional trays or adapters employed to convey a plurality of slides as a unit that may be placed into engagement with the viewer in one single operation, and may easily be removed with one operation, thereby making it possible to transport and convey a number of slides without handling the slides individually.

The device is extremely simple in design, is economical to manufacture, yet highly efficient for the purpose for which it is intended. Other and further objects of my invention will become more apparent as the description proceeds when taken in conjunction with the drawings in which:

Figure 1 is a perspective view, showing a table model viewer for photostatic slides, constructed in a manner to accommodate the slides in adapters or trays claimed as my invention.

Figure 2 is a composite perspective view of a set of adapters, one loaded with slides, the other open for the acceptance of the slides when the adapter trays are placed into engagement with the viewer as shown in Figure 1.

Figure 3 is a composite perspective view of the main body and the end plates constituting the tray or adapter.

Figure 4 is a cross sectional view of an adapter.

Figure 5 is a top or plan view of a pair of adapter trays inserted into the front receptacles of a table type viewer as shown in Figure 1, and illustrating one of the trays loaded with slides and the other arranged to receive the slides as they are conveyed from the filled tray through the viewer carriage.

Figure 6 is a fragmentary cross sectional view taken at the line 6—6 in Figure 5, and Figure 7 is a fragmentary cross sectional view taken at the lines 7—7 in Figure 5.

Similar characters of reference indicate corresponding parts throughout the several views and referring now to the same, the character 10 shows the base of a table type viewer, which viewer is equipped with the enclosure 11 which houses the lamp and reflector arrangement and is provided with a viewer lens shown as 12 in its forward face.

The forward portion of the base 10 is provided with a pair of receptacles 13 and 14, consisting of a rear wall 15, side walls 16 and 16', horizontal floor plates 17 and 17', and front walls 18 and 18'. These front walls are open at 19 and 19' and the receptacles 13 and 14 are separated from one another by a central partition 20, which slidably supports a carriage 21 which is adapted to receive the individual slides which are designated by the character 22. The carriage 21 has a handle arrangement 23 extending outward therefrom to enable the operator to manipulate the carriage inward and outward, to place the individual slides 22 into position into the enclosure 11, where the subject matter portrayed on the film in the slide, is being projected onto the lens shown as 12 on the forward face of the enclosure 11.

There are a pair of actuated pusher plates 24 and 24' disposed within the receptacles 13 and 14 respectively. These plates 24 and 24' are equipped with guide members 25 projecting downward therefrom and engaging longitudinal slots 26 and 26' within the bottoms 17 and 17' respectively, and resilient members 27 below the bottom 17 and 17' urge the pusher plates 24 and 24' toward the centrally disposed partition 20.

The bottom plates 17 and 17' are also provided with upwardly extending longitudinal flanges shown as 28, on which the slides 22 rest as they are moved from one receptacle 13 to the other receptacle 14, as they engage the carriage 21 when the carriage is pushed inward, and expelled from the carriage 21 as it is manually pulled outward.

In the normal construction of the viewer, the individual slides 22 are placed between the pusher plates 24 and the central partition 20 in the receptacle 13 and as they pass through the carriage 21 they will engage the inner face of the pusher plate 24' and be forced into the receptacle 14 and will be disposed between the plate 24' and the partition 20. However with the use of my invention the plates are not handled individually but by means of trays.

The tray assembly constituting my invention consists of an angular plate constructed of a front 29 and a bottom 30 and a downwardly disposed flange 31 which engages longitudinal slots 32 disposed within the bottom plates 17 and 17' of the receptacles 13 and 14.

The front plate 29 has a plurality of elongated slots 33 extending therethrough to accommodate tongues 34 disposed on the forward edge of side members 35, and the bottom plate 30 has similar slots 33 extending therethrough to accommodate tongues 36 on the bottom edge of the side members 35. The tongues 34 have downwardly disposed members 37 to lock the side members into position in the front plate 29 when the tongues 36 engage the slots 33 in the bottom plate 30, as illustrated in Figure 4.

The forward face of the flange 31 is equipped with outwardly projecting engaging points 38.

From the foregoing description it will become manifest that by providing the front walls 18 and 18' of the receptacle 13 and 14 with the open portions 19 and 19' it will be possible to insert the assembled trays into which the slides 22 are disposed, in the following manner:

The side members 35 are put into position by engaging the tongues 34 and 36 into the slots 33 and by forcing the member 35 downward it will cause the downwardly projecting members 37 on the tongue 34 to retain them in vertical position. The one side member 35 may be shifted to accommodate any number of slides 22, and the slides will rest on the base 39. When the entire assembled trays are tipped forward, the slides 22 will rest on the inner face of the front plate 29. The loaded trays are handled as completed assembled units, and make it possible to manipulate a plurality of slides at one time.

When loading the viewer it is only necessary to move the pusher plate 24 toward the wall 16 and insert the complete assembled loaded tray into position in a manner whereby the flange 31 is inserted into the longitudinal slot 32. It is then necessary to remove the end plates 35 from both ends of the tray which will permit the slides 22 to be forced toward the carriage 21 by the pusher plate 24. Next move the other pusher plate shown as 24' toward the wall 16' in the receptacle 14 and insert another tray without end plates 35 into the slot 32 in the bottom of the receptacle 14. It will be noted that the small outwardly projecting members 38, will hold the flange 31 in position. Next release the pusher plate 24', which will cause it to be forced by the resilient member 27 toward the carriage 21 in the partition 20. The device is now ready for operation and as the slides 22 engage the carriage 21 slidably supported within the partition 20 they will be ready for projection on the lens 12 when the carriage 21 is pushed inward by the handle or knob 23. As the carriage 21 is pulled outward the slide 22 will be forced against the pusher plate 24' and the next slide will be in position within the carriage. After all the slides have passed through the carriage 21 the end plates 35 are inserted into position on the filled adapter within the receptacle 14, and it then may be tilted forward out of engagement with the slot 32 and removed from the viewer. The empty tray may then be moved from the receptacle 13 and placed into position in the receptacle 14 as outlined above and a new tray filled with slides may be placed into the receptacle 13 as described above. In this manner a plurality of slides may be handled as individual units within the trays, and the filled trays when removed from the viewer may be stored in any convenient manner.

The trays are adapted to support any number of slides of any type. Obviously, if the slides are constructed in a manner whereby the photographic film is disposed between glass plates, they will be thicker than the slides constructed of paper supporting the film, which will be thinner, and accordingly the number of slides will be accommodated by the tray.

While I have shown a particular arrangement of the component parts constituting my device, I am fully cognizant of the fact that many changes may be made in the form and configuration of the parts without affecting their operativeness and changes may be made without departing from the spirit of my invention in the scope of the appended claims.

Having thus described my invention, what I claim and desire to secure by Letters Patent in the United States is:

1. A tray assembly forming slide holders to be used in combination with a photographic viewer having adapter slots disposed therein, said slide holders being constructed of flat sheet material formed at a right angle providing a front and bottom plate, said bottom plate being longitudinally disposed on said front plate and having a downwardly extending flange integrally constructed therewith for engagement with an adapter slot in said viewer, end plates for holding slides in said holder, said end plates being constructed of flat sheet material and having tongue members extending outward from two of their edges, elongated apertures disposed through said front and bottom plates, said slots disposed in alignment with and adapted to receive the tongues on the edge of said end plates for retaining the end plates in a vertical position.

2. A tray assembly forming slide holders to be used in combination with photographic viewers having adapter slots disposed therein, said slide holders being constructed of flat sheet material formed at a right angle providing a front and bottom plate, said bottom plate being longitudinally disposed on said front plate and having a downwardly extending flange integrally constructed therewith for engagement with an adapter slot in said viewer, projecting means on the outer face of said flange for retaining said flange in engagement with said adapter slot when said flange is inserted therein, end plates for holding slides in said holders, said end plates being constructed of flat sheet material and having tongue members extending outward from two of their edges, elongated slots disposed through the front and bottom plates, said slots being disposed in alignment with and adapted to receive the tongues on the edges of the said end plate for retaining said end plates in a vertical position.

3. A tray assembly forming slide holders to be used in combination with a photographic viewer provided with longitudinally disposed adapter slots, said slide holders being constructed of flat sheet material formed at a right angle, providing a front and bottom plate, said bottom plate being longitudinally disposed on said front plate and having a downwardly extending flange integrally constructed therewith for engagement with an adapter slot in said viewer, end plates, said end plates having straight tongue members extending from the lower edge and hooked tongue members extending from the forward edge, elongated apertures formed through said front and bottom plates, said apertures being disposed in alignment with and adapted to receive the tongues on the edges of said end plates for retaining the end plates in a vertical position.

References Cited in the file of this patent

UNITED STATES PATENTS

| Number | Name | Date |
|---|---|---|
| 1,402,791 | Petherick | Jan. 10, 1922 |
| 2,083,600 | Gubisch | June 15, 1937 |
| 2,427,164 | Stechbart | Sept. 9, 1947 |
| 2,482,117 | Leas | Sept. 20, 1949 |
| 2,487,862 | Gardner | Nov. 15, 1949 |
| 2,503,239 | Antos | Apr. 11, 1950 |
| 2,513,102 | Parlini et al. | June 27, 1950 |
| 2,525,564 | Simmons | Oct. 10, 1950 |
| 2,549,898 | Fish | Apr. 24, 1951 |
| 2,583,442 | Parlini et al. | Jan. 22, 1952 |
| 2,590,492 | Bennett et al. | Mar. 25, 1952 |